(12) United States Patent
Stephens

(10) Patent No.: US 7,200,374 B1
(45) Date of Patent: Apr. 3, 2007

(54) METHOD AND APPARATUS TO IMPROVE THROUGHPUT IN A WIRELESS NETWORK USING A MINIMUM RECEIVED INTERFERENCE POWER LEVEL

(75) Inventor: Adrian P. Stephens, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 429 days.

(21) Appl. No.: 10/738,009

(22) Filed: Dec. 16, 2003

(51) Int. Cl.
    H04B 1/10 (2006.01)
(52) U.S. Cl. ............... 455/254; 455/226.3; 455/67.11
(58) Field of Classification Search ............ 455/67.11, 455/226.1, 226.3, 254, 296
    See application file for complete search history.

(56) References Cited

U.S. PATENT DOCUMENTS 6,823,005 B1 * 11/2004 Chuang et al. ............. 375/227
2003/0013415 A1 * 1/2003 Shoji et al. ................ 455/67.3
2004/0005885 A1 * 1/2004 Kato et al. ............... 455/422.1
2004/0023665 A1 * 2/2004 Simmonds et al. ....... 455/456.1
2004/0203465 A1 * 10/2004 Goldstein et al. ........ 455/67.13
2004/0229621 A1 * 11/2004 Misra ......................... 455/445
2004/0235439 A1 * 11/2004 Husted et al. .............. 455/136
2005/0090250 A1 * 4/2005 Backes ....................... 455/434

* cited by examiner

*Primary Examiner*—Edward F. Urban
*Assistant Examiner*—Blane J. Jackson
(74) *Attorney, Agent, or Firm*—The Law Offices of John C. Scott, LLC

(57) ABSTRACT

Aggregate throughput may be improved in a wireless network by rejecting packets that have a low probability of creating harmful interference within a wireless device. In at least one embodiment, a minimum received interference power level that is likely to cause a loss of packets is first estimated. Subsequently received packets that have a received signal strength below the minimum level may then be rejected.

32 Claims, 5 Drawing Sheets

METHOD AND APPARATUS TO IMPROVE THROUGHPUT IN A WIRELESS NETWORK USING A MINIMUM RECEIVED INTERFERENCE POWER LEVEL

FIELD OF THE INVENTION

The invention relates generally to wireless communications and, more particularly, to techniques and structures for improving communication throughput in a wireless network.

BACKGROUND OF THE INVENTION

In a wireless network, one way to provide higher aggregate throughput as the density and/or demands of users increases is to increase the number of wireless access points (APs) within a region and have each wireless AP cover a smaller service area or cell. However, as the sizes of the service areas decrease, other problems may arise that could actually have a negative impact on the throughput of the network. For example, because the service areas are smaller, there will typically be less distance between co-channel cells within the network. Thus, a device in the service area of a first AP may be able to detect a packet transmitted by a device in the service area of a second, co-channel AP in the network. If the packet transmitted by the device in the service area of the second AP includes a medium reservation request, then the device in the service area of the first AP may honor the medium reservation request (e.g., refrain from transmitting for a predetermined duration, etc.) regardless of whether or not there is a potential for harmful interference. By honoring the reservation request when the chances of creating harmful interference are small, aggregate throughput in the network may be reduced.

DETAILED DESCRIPTION

Figure 1:
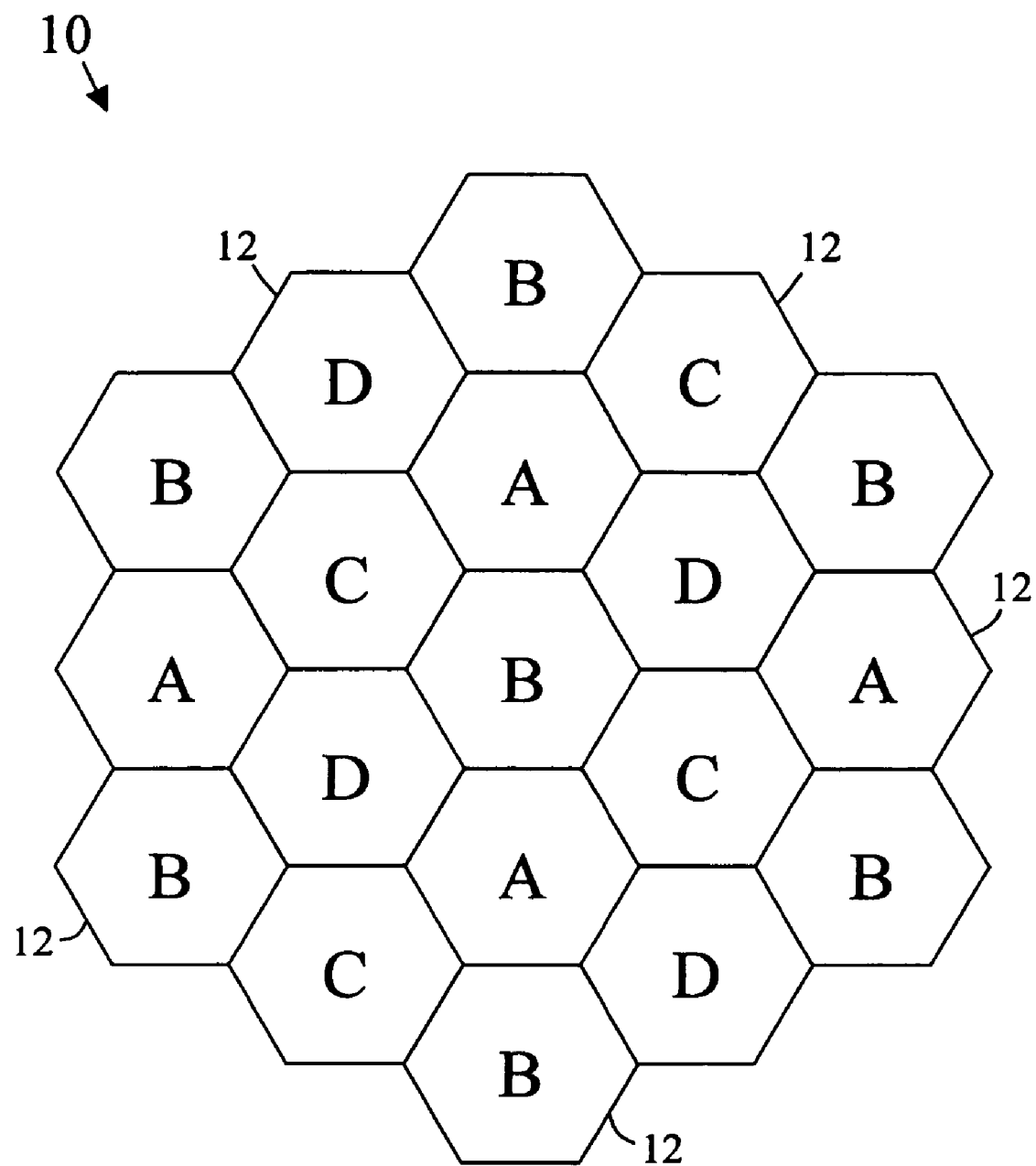
FIG. 1 is a diagram illustrating an example wireless network arrangement that may be used to service wireless users in an extended region.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a diagram illustrating an example wireless network arrangement 10 that may be used to service wireless users in an extended network region. As shown, a number of service areas or "cells" 12 have been established within the region. Each of the cells 12 includes a corresponding wireless access point (AP) (not shown) to allow wireless users within the cell to access the network. The wireless users within each cell 12 will each have a wireless client device that allows them to communicate with the corresponding AP. The wireless client device may include any type of device that is capable of wirelessly accessing a network including, for example, a desktop, laptop, palmtop, or tablet computer with wireless networking functionality, a personal digital assistant (PDA) with wireless networking functionality, a cellular telephone or other handheld wireless communicator, a pager, and/or others.

Some form of frequency reuse strategy may be implemented within a network to allow available frequencies to be efficiently utilized while preventing interference between different cells. For example, in the arrangement 10 of FIG. 1, the labels A, B, C, and D within the cells 12 are used to identify frequency bands that are operative within each cell 12. As shown, the cells 12 are arranged so that no two adjacent cells use the same frequency band. However, non-adjacent cells 12 may use the same frequency band as they are usually far enough away from one another so that interference is avoided (e.g., in the arrangement 10 of FIG. 1, any two A cells have at least one non-A cell between them). Any number of different frequency bands may be allocated for use within a network arrangement. Other frequency reuse patterns may alternatively be used and will typically depend upon the number of frequency bands that are available for use within a network. Although illustrated as regular hexagons for illustration purposes, it should be understood that the actual sizes and shapes of the individual cells 12 within a network will typically be less uniform and less precise.

To increase the overall throughput of the network arrangement 10 of FIG. 1, a larger number of cells may be used to cover the same overall area. Thus, each of the cells in the new arrangement will, on average, be smaller in size. This being the case, the distance between co-channel cells (e.g., two A cells) will now be smaller than it was previously. Because of the closer proximity of the co-channel cells, the possibility of transmissions within one cell being sensed in another co-channel cell is increased.

In some wireless networking technologies, a medium reservation request may be made by a client device within a cell that requests that other client devices within the cell refrain from transmitting for a specific amount of time (e.g., until a corresponding transmitted packet ends, until a corresponding packet exchange has completed, etc.). In this manner, collisions between transmitted packets may be avoided within the cell. When a collision occurs within a cell, the corresponding data is typically lost and re-transmissions are usually required. When the distance between co-channel cells is relatively small, the medium reservation requests transmitted within one cell may be detectable within other co-channel cells within the network. These medium reservation requests may be honored by one or more devices in a co-channel cell, even when the corresponding signals pose little or no threat of creating harmful interference (e.g., interference that may result in loss of data) in the co-channel cell. By honoring medium reservation requests when there is little or no chance of harmful interference being created, the aggregate throughput of the network will typically suffer. In at least one aspect of the present invention, techniques and structures are provided that allow a device to reject or ignore transmitted packets that pose little or no threat of creating harmful interference within the device.

Figure 2:
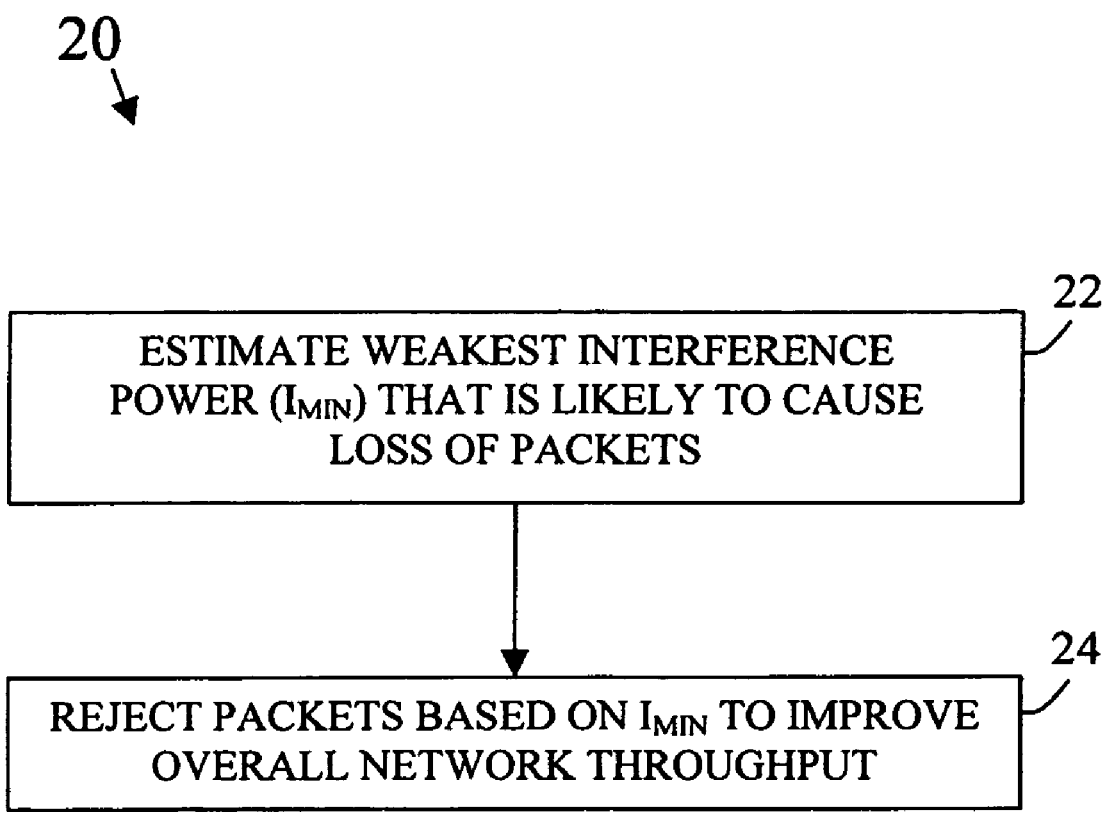
FIG. 2 is a flowchart illustrating an example method for use in improving overall throughput within a wireless network in accordance with an embodiment of the present invention.

FIG. 2 is a flowchart illustrating an example method 20 for use in improving overall throughput in a wireless network in accordance with an embodiment of the present invention. The method 20 may be performed in connection with, for example, a wireless client device or wireless access point within a wireless network. First, a weakest received interference power ($I_{MIN}$) that is likely to cause a loss of packets within a wireless device is estimated (block 22). Then, subsequently received packets that have a receive power that is less than $I_{MIN}$, or a derivative thereof, are rejected (block 24). In this manner, packets that have little chance of creating harmful interference may be ignored by a device while packets that have a higher chance of creating harmful interference may be considered (and a corresponding medium reservation request, if any, may be honored). In at least one implementation, the sensitivity of a receiver is adjusted based on the value of $I_{MIN}$ so that packets having a power level below $I_{MIN}$ are not detected. In other implementations, received packets are simply discarded if their measured receive power is below $I_{MIN}$ (or a derivative thereof). Other techniques for rejecting packets based on $I_{MIN}$ may alternatively be used.

Figure 3:
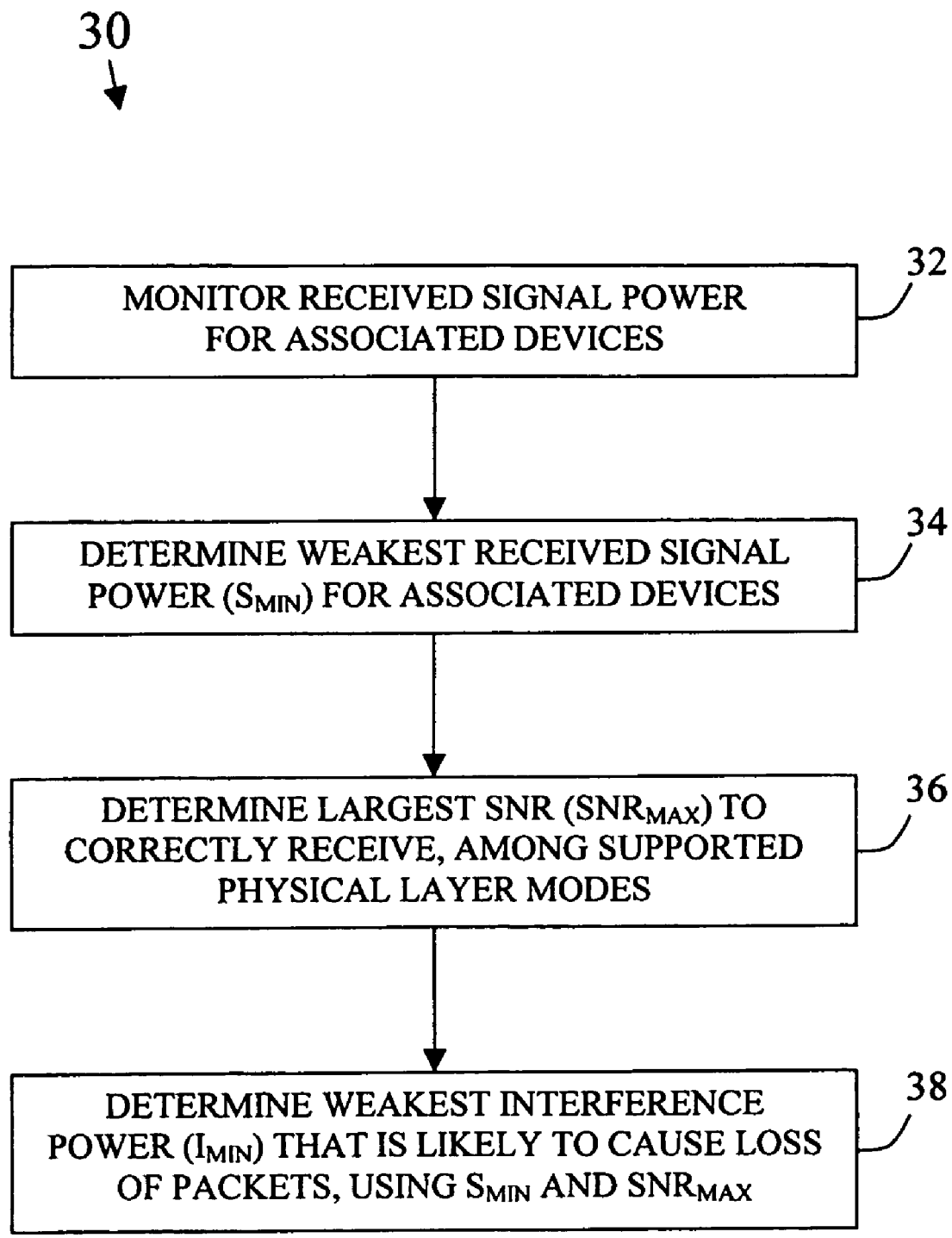
FIG. 3 is a flowchart illustrating an example method for use in estimating a weakest received interference power that may cause loss of packets for a wireless device in accordance with an embodiment of the present invention.

FIG. 3 is a flowchart illustrating an example method 30 for use in estimating a weakest received interference power ($I_{MIN}$) that is likely to cause a loss of packets within a wireless device in accordance with an embodiment of the present invention. The method 30 of FIG. 3 may be used, for example, as part of the method 20 of FIG. 2. With reference to FIG. 3, the received signal powers of wireless devices within a common cell (or basic service set (BSS)) as a subject device are monitored (block 32). In a network following the IEEE 802.11 wireless networking standard (ANSI/IEEE Std 802.11-1999 Edition and its supplements), for example, a received signal strength indication (RSSI) value may be measured and recorded for each of the devices within a BSS as part of the monitoring process. A weakest received signal power ($S_{MIN}$) is then determined from among the devices within the BSS (block 34). For example, in one possible approach, a smallest RSSI value is selected from a number of recorded values.

Each physical mode of operation of a wireless device within a wireless network may have a corresponding signal-to-noise ratio (SNR) value that is required to reliably receive data within a corresponding receiver. For example, binary phase shift keying (BPSK) operation may require a first SNR value to reliably receive, quadrature phase shift keying (QPSK) operation may require another SNR value to reliably receive, 16 quadrature amplitude modulation (16 QAM) operation may require yet another SNR value, etc. The largest of these SNR values among the different physical layer modes ($SNR_{MAX}$) is selected (block 36). $I_{MIN}$ is then calculated using the $S_{MIN}$ and $SNR_{MAX}$ values (block 38). In at least one implementation, $I_{MIN}$ is calculated as follows:

$$I_{MIN}(dBm) = S_{MIN}(dBm) - SNR_{MAX}(dB)$$

Other techniques for estimating $I_{MIN}$ may alternatively be used. Once calculated, the $I_{MIN}$ value may be used to improve overall throughput in the network by limiting the number of receive packets that will be considered within a device. In at least one embodiment, a fixed margin value (e.g., 6 dB, etc.) may be added to the $SNR_{MAX}$ value in the above equation before subtraction. Also, an upper limit may be placed on the value of $S_{MIN}$ so that the resulting $I_{MIN}$ value is not too high.

Figure 4:
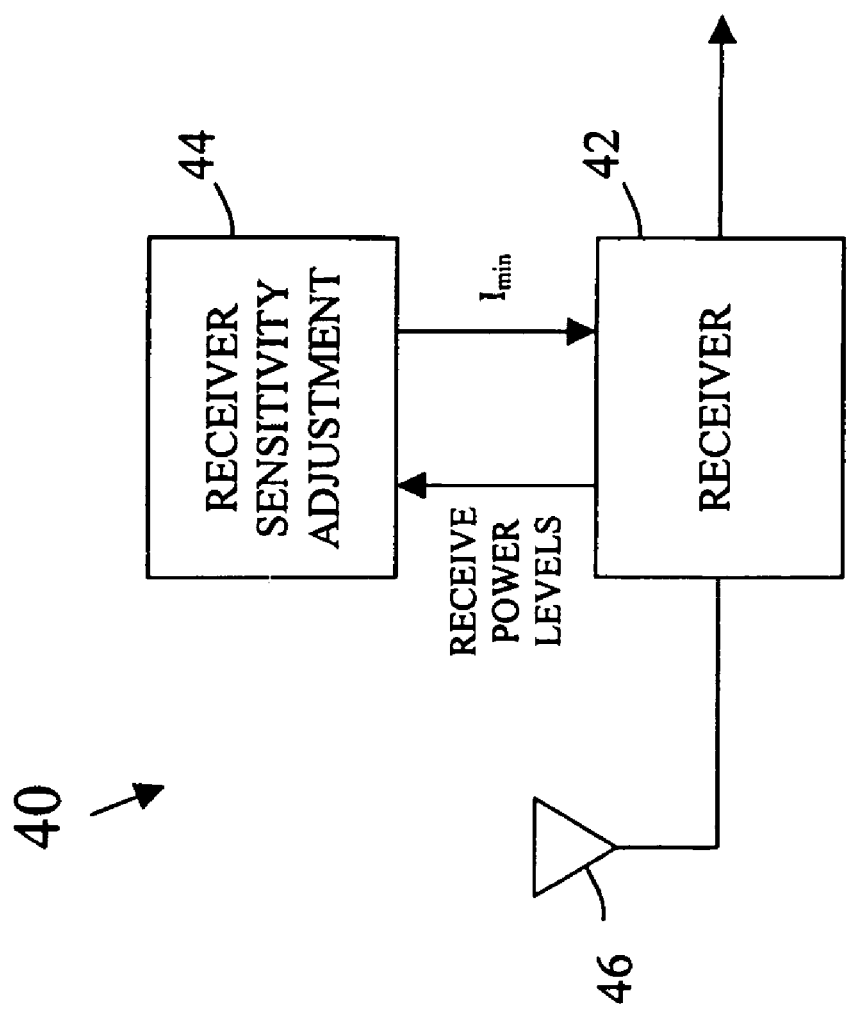
FIG. 4 is a block diagram illustrating an example wireless apparatus in accordance with an embodiment of the present invention.

FIG. 4 is a block diagram illustrating an example wireless apparatus 40 in accordance with an embodiment of the present invention. The wireless apparatus 40 may be part of, for example, a wireless client device, a wireless access point, a wireless network interface card or other network interface structure, a radio frequency integrated circuit (RFIC), and/or others. As illustrated, the wireless apparatus 40 may include a wireless receiver 42 and a receiver sensitivity adjustment unit 44. The wireless receiver 42 is operative for receiving packets from a wireless channel via an antenna 46. The antenna 46 may comprise any type of antenna including, for example, a dipole antenna, a patch antenna, a helical antenna, an antenna array, and/or others. Antenna diversity techniques may also be used. The wireless receiver 42 has an adjustable receiver sensitivity. Receiver sensitivity may be defined as the minimum input power level that will be reliably received by a corresponding receiver. The receiver sensitivity adjustment unit 44 is operative for adjusting the sensitivity of the wireless receiver 42 in a manner that prevents packets from being received that have a low probability of creating harmful interference. The receiver sensitivity adjustment unit 44 may adjust the sensitivity of the receiver 42 is a dynamic manner. In at least one embodiment of the invention, the receiver sensitivity adjustment unit 44 estimates a value for $I_{MIN}$ and uses it to set the sensitivity of the wireless receiver 42. The receiver sensitivity adjustment unit 44 may use the method 30 of FIG. 3 to estimate $I_{MIN}$, or some other method may be used. In at least one approach, the receiver sensitivity adjustment unit 44 may regularly (e.g., periodically, at predetermined times, continuously, from time to time, etc.) update the value of $I_{MIN}$ so that it reflects a current wireless environment about the corresponding device.

Figure 5:
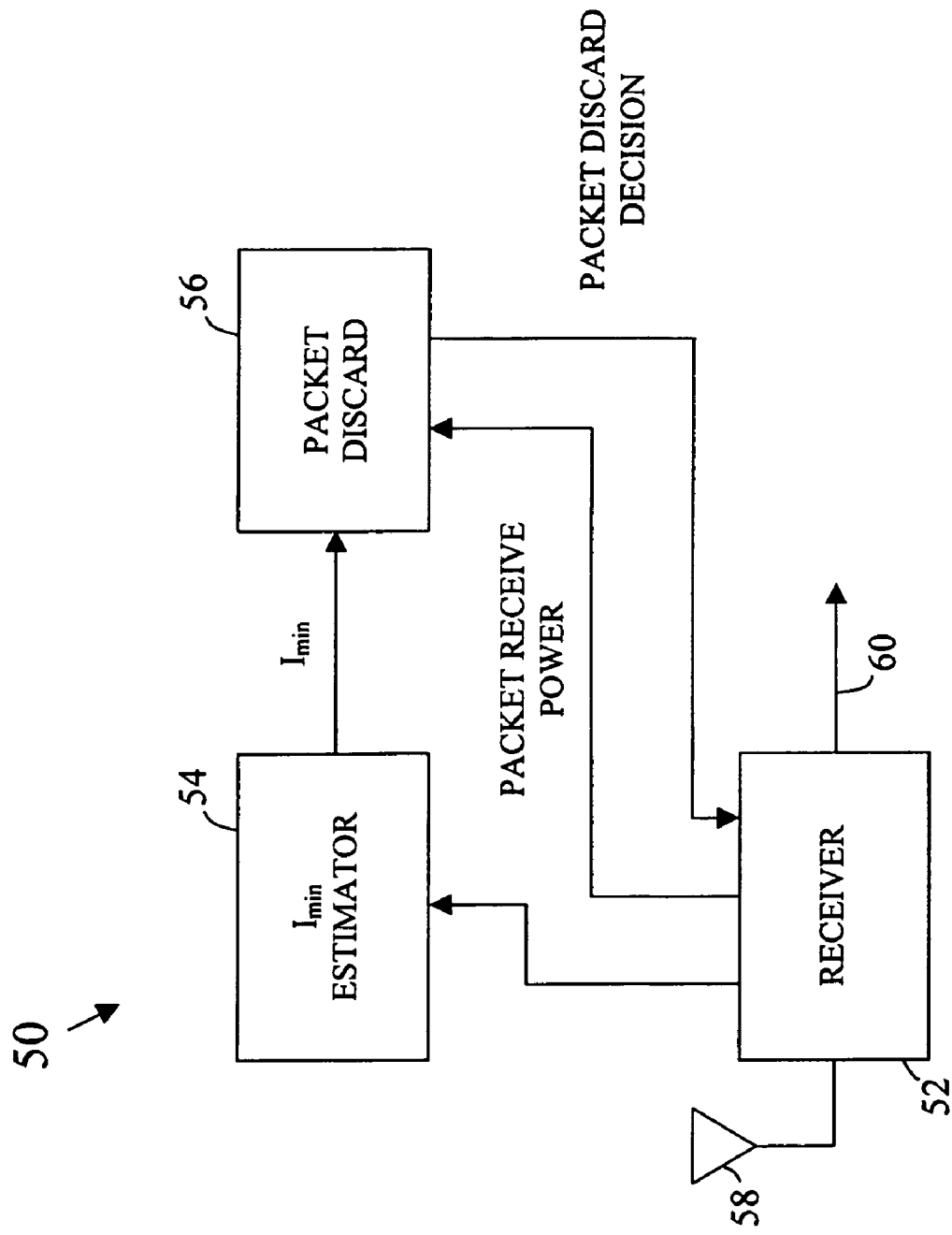
FIG. 5 is a block diagram illustrating an example wireless apparatus in accordance with another embodiment of the present invention.

FIG. 5 is a block diagram illustrating an example wireless apparatus 50 in accordance with an embodiment of the present invention. The wireless apparatus 50 is capable of achieving a similar result to the apparatus 40 of FIG. 4. However, the apparatus 50 may be implemented in a system that uses a wireless receiver that does not have an adjustable sensitivity (although it can also be used with receivers that have an adjustable sensitivity). As illustrated, the wireless apparatus 50 may include: a wireless receiver 52, an $I_{MIN}$ estimator 54, and a packet discard unit 56. The wireless receiver 52 may be coupled to an antenna 58 as described previously. The $I_{MIN}$ estimator 54 may be used to estimate the weakest interference power that is likely to cause a loss of packets. The $I_{MIN}$ estimator 54 may use, for example, the method 30 of FIG. 3 (or some other technique) to estimate $I_{MIN}$. The packet discard unit 56 causes packets received by the receiver 52 to be discarded based on a comparison of the receive powers of the packets with the $I_{MIN}$ estimate. In one approach, for example, for each packet received, the receiver 52 may measure a corresponding received power level (RPL). In a system following the IEEE 802.11 wireless networking standard, a received signal strength indication (RSSI) value may be determined for each received packet. The receiver 52 may deliver the received power level information to the packet discard unit 56 which compares the value to the $I_{MIN}$ estimate. The packet discard unit 56 may then make a packet discard decision based on the comparison and deliver the decision to the receiver 52. If the packet discard decision indicates that a packet is to be discarded, the receiver 52 will not allow the packet to pass to an output 60 thereof. Thus, if a discarded packet includes a medium reservation request, the medium reservation request will not be honored. Other architectures may alternatively be used to effect a discard of packets based on an $I_{MIN}$ value.

In one possible implementation, the packet discard unit 56 may decide that a received packet is to be discarded if the received power level of the packet is below $I_{MIN}$ or another value that is derived from $I_{MIN}$ (e.g., $I_{MIN}$ —fixed margin value). In other implementations, additional factors may be taken into consideration in making the packet discard decision. For example, in at least one embodiment, the packet discard unit 56 may be configured so that probe requests and/or association requests will not be discarded, even if they are weaker than the defined threshold. In this manner, a new device within a BSS will be able to probe a corresponding AP even when the other devices within the BSS are relatively close to the AP (and thus have a higher average received power). Similarly, the packet discard unit 56 may be configured so that only packets that are not associated with the same BSS as the apparatus 50 will be discarded (i.e., if they also meet the other discard criteria). In this manner, a weak device within a BSS may be detected by other devices in the same BSS even if the device was not transmitting when $I_{MIN}$ was estimated. The $I_{MIN}$ estimator 54 may regularly update the $I_{MIN}$ estimate so that it reflects a current wireless environment about the corresponding device.

In all of the embodiments discussed herein, an upper limit may be placed on the value of $I_{MIN}$ so that an excessively high value is not used. Thus, in at least one implementation, the $I_{MIN}$ estimator 54 may first use the method 30 of FIG. 5 (or another method) to estimate an $I_{MIN}$ value, then compare the $I_{MIN}$ estimate to an upper limit value and, if the estimate is greater than the upper limit value, output the upper limit value as the $I_{MIN}$ estimate.

It should be appreciated that the individual blocks illustrated in the block diagrams herein may be functional in nature and do not necessarily correspond to discrete hardware elements. For example, in at least one embodiment, two or more of the blocks within a diagram are implemented in software within a single (or multiple) digital processing device(s). The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be made.

In the above-described embodiments, the invention has been described using some terms that are commonly associated with the IEEE 802.11 wireless networking standard. It should be understood, however, that the inventive concepts are not limited to use within networks following the IEEE 802.11 standard. On the contrary, the inventive concepts may be implemented within wireless networks following any wireless networking standard.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
    estimating a minimum received interference power level that is likely to result in packet loss within a wireless device; and
    rejecting packets having a receive power level that is below said minimum received interference power level in said wireless device;
    wherein estimating a minimum received interference power level includes:
        measuring received signal powers associated with other devices within a common basic service set as said wireless device;
        identifying a weakest of said received signal powers ($S_{MIN}$);
        determining a largest signal-to-noise ratio ($SNR_{MAX}$) for correctly receiving data among a plurality of operating modes of said wireless device; and
        calculating said minimum received interference power level using $S_{MIN}$ and $SNR_{MAX}$.

2. The method of claim 1, further comprising:
    repeating estimating a minimum received interference power level during operation of said wireless device to maintain an updated minimum received interference power level.

3. The method of claim 1, wherein:
    rejecting packets includes adjusting a receiver sensitivity associated with a wireless receiver of said wireless device based on said estimated minimum received interference power level.

4. The method of claim 1, wherein:
    rejecting packets includes comparing a received power level of a first packet to said minimum received interference power level and discarding said first packet based on said comparison.

5. The method of claim 1, wherein:
    rejecting packets includes only rejecting packets that are not associated with the same basic service set as said wireless device.

6. The method of claim 1, wherein:
    probe request packets are not rejected in rejecting packets.

7. The method of claim 1, wherein:
    association request packets are not rejected in rejecting packets.

8. The method of claim 1, wherein:
    said minimum received interference power level is determined based upon received power levels associated with other devices within a common basic service set as said wireless device.

9. The method of claim 1, wherein:
estimating a minimum received interference power level includes:
 calculating a preliminary minimum received interference power level;
 comparing said preliminary minimum received interference power level to an upper limit value; and
 when said preliminary minimum received interference power level is greater than said upper limit value, using said upper limit value as said minimum received interference power level.

10. The method of claim 1, wherein:
calculating said minimum received interference power level includes calculating a difference between $S_{MIN}$ and $SNR_{MAX}$.

11. The method of claim 1, wherein:
identifying a weakest of said received signal powers includes:
 identifying a preliminary weakest of said received signal powers;
 comparing said preliminary weakest of said received signal powers to an upper limit value; and
 when said preliminary weakest of said received signal powers is greater than said upper limit value, using said upper limit value as said weakest of said received signal powers.

12. A wireless apparatus comprising:
a wireless receiver; and
a receiver sensitivity adjustment unit to adjust a sensitivity of said wireless receiver in a manner that prevents packets from being received that have a low probability of creating harmful interference;
wherein said receiver sensitivity adjustment unit adjusts said sensitivity of said wireless receiver based on a minimum received interference power level that is likely to result in packet loss within the wireless apparatus;
wherein said receiver sensitivity adjustment unit includes a minimum received interference power level estimator to estimate said minimum received interference power level;
wherein said wireless apparatus has a number of operating modes, wherein each of said operating modes has a corresponding signal-to-noise ratio (SNR) that is required to accurately receive data in that operating mode; and
wherein said minimum received interference power level estimator uses a maximum SNR associated with said operating modes to determine said minimum received interference power level.

13. The wireless apparatus of claim 12, wherein:
said minimum received interference power level estimator estimates said minimum received interference power level using a weakest received signal power from other devices within a common basic service set as said wireless apparatus.

14. The wireless apparatus of claim 12, wherein:
said minimum received interference power level estimator regularly updates said minimum received interference power level.

15. The wireless apparatus of claim 12, wherein:
said receiver sensitivity adjustment unit adjusts said sensitivity of said wireless receiver dynamically with time.

16. A wireless apparatus comprising:
a wireless receiver;
a minimum received interference power level estimator to estimate a minimum received interference power level that is likely to result in packet loss within the wireless apparatus; and
a packet discard unit to discard a received packet based on a comparison of a receive power of said received packet with said estimated minimum received interference power level;
wherein said wireless apparatus has a number of operating modes, wherein each of said operating modes has a corresponding signal-to-noise ratio (SNR) that is required to accurately receive data in that operating mode; and
wherein said minimum received interference power level estimator uses a maximum SNR associated with said operating modes to determine said minimum received interference power level.

17. The wireless apparatus of claim 16, wherein:
said minimum received interference power level estimator estimates said minimum received interference power level using a weakest received signal power from other devices within a common basic service set as said wireless apparatus.

18. The wireless apparatus of claim 16, wherein:
said minimum received interference power level estimator is configured to regularly update said minimum received interference power level.

19. The wireless apparatus of claim 16, wherein:
said packet discard unit does not discard packets associated with the same basic service set as said wireless apparatus.

20. The wireless apparatus of claim 16, wherein:
said packet discard unit does not discard probe request packets.

21. The wireless apparatus of claim 16, wherein:
said packet discard unit does not discard association request packets.

22. The wireless apparatus of claim 16, wherein:
said minimum received interference power level estimator has an upper limit that the estimated minimum received interference power level cannot exceed.

23. An article comprising a storage medium having instructions stored thereon that, when executed by a computing platform, result in:
estimating a minimum received interference power level that is likely to result in packet loss within a wireless device; and
rejecting packets having a receive power level that is below said estimated minimum received interference power level in said wireless device;
wherein estimating a minimum received interference power level includes:
 measuring received signal powers associated with other devices within a common basic service set as said wireless device;
 identifying a weakest of said received signal powers ($S_{MIN}$);
 determining a largest signal-to-noise ratio ($SNR_{MAX}$) for correctly receiving data among a plurality of operating modes of said wireless device; and
 calculating said minimum received interference power level using $S_{MIN}$ and $SNR_{MAX}$.

24. The article of claim 23, further comprising:
repeating determining a minimum received interference power level to maintain an updated minimum received interference power level.

25. The article of claim 23, wherein:
rejecting packets includes adjusting a receiver sensitivity associated with a wireless receiver of said wireless device based on said estimated minimum received interference power level.

26. The article of claim 23, wherein:
rejecting packets includes comparing received power levels of received packets to said minimum received interference power level and discarding packets based on said comparison.

27. The article of claim 26, wherein:
discarding packets includes only discarding packets that are not associated with a predetermined basic service set.

28. A wireless system comprising:
at least one dipole antenna;
a wireless receiver in communication with said at least one dipole antenna; and
a receiver sensitivity adjustment unit to adjust a sensitivity of said wireless receiver in a manner that prevents packets from being received that have a low likelihood of creating harmful interference;
wherein said receiver sensitivity adjustment unit adjusts said sensitivity of said wireless receiver based on a minimum received interference power level that is likely to result in packet loss within the wireless apparatus;
wherein said receiver sensitivity adjustment unit includes a minimum received interference power level estimator to estimate said minimum received interference power level;
wherein said wireless apparatus has a number of operating modes, wherein each of said operating modes has a corresponding signal-to-noise ratio (SNR) that is required to accurately receive data in that operating mode; and
wherein said minimum received interference power level estimator uses a maximum SNR associated with said operating modes to determine said minimum received interference power level.

29. The wireless system of claim 28, wherein:
said minimum received interference power level estimator is configured to regularly update said minimum received interference power level.

30. The wireless system of claim 28, wherein:
said receiver sensitivity adjustment unit adjusts said sensitivity of said wireless receiver dynamically with time.

31. The wireless system of claim 28, wherein:
said wireless system is a wireless client device.

32. The wireless system of claim 28, wherein:
said wireless system is a wireless access point.

* * * * *